Patented June 17, 1952

2,600,681

UNITED STATES PATENT OFFICE 2,600,681

SELF-SUPPORTING FILMS FROM POLYVINYL HALIDE LATEX

Harold F. Park, East Longmeadow, and Milton J. Scott, Springfield, Mass., assignors to Monsanto Chemical Company, St. Louis, Mo., a corporation of Delaware No Drawing. Application March 5, 1948, Serial No. 13,341

7 Claims. (Cl. 260—29.6)

This invention relates to film-forming aqueous dispersions of polymers and copolymers of vinyl halides. More particularly, the invention relates to the modification of such dispersions with water-soluble ethers of methylol melamines.

Aqueous dispersions of vinyl polymers and copolymers are well known. Attempts to employ them for casting films have been frustrated by an uneven three dimensional shrinkage of the film on removal of the water. The uneven shrinkage made it virtually impossible to cast a film to meet specific requirements of thickness and shape.

It is an object of this invention to provide improved aqueous dispersions of polymers and copolymers of vinyl halides.

A further object is to so modify aqueous dispersions of polymers and copolymers of vinyl halides that films may be cast therefrom to meet specific requirements of thickness and shape.

Another object is to modify aqueous dispersions of vinyl halide polymers and copolymers with water-soluble ethers of methylol melamines.

These and other objects are attained by adding a minor proportion of a water-soluble ether of a methylol melamine to aqueous dispersions of vinyl halide polymers and copolymers.

The following examples are given to illustrate this invention and are not intended as limitations on the scope thereof. Where parts are mentioned, they are parts by weight.

Example I 8 parts of a methyl ether of hexamethylol melamine were added to 100 parts of an aqueous dispersion containing 50 parts of a vinyl chloride-diethyl maleate copolymer. The mixture was subjected to mechanical agitation until a uniform dispersion was obtained. A film .020" thick was cast on a glass plate from the synthetic latex thus produced. On drying at 105° C., the thickness of the film was reduced to .010" (approximately a 50% loss in volume) but the broad dimensions of the film were unchanged. By carefully regulating the thickness of the film as cast, accurate control of the final thickness of the dried film is attained. The film obtained was clear, transparent, tough and smooth.

In contrast, a film cast from an unmodified portion of the vinyl chloride-diethyl maleate copolymer dispersion shrank unevenly in three dimensions on drying at 105° C. although the total shrinkage was about the same, i. e., about 50% of the original volume. The resultant film was cracked in many places, irregular in thickness and the broad dimensions were uneven and substantially less than the dimensions of the film as cast.

The vinyl chloride-diethyl maleate copolymer dispersion of the example was made by copolymerizing about 70 parts of vinyl chloride with about 30 parts of diethyl maleate in aqueous emulsion at about 50° C. for from 10–20 hours. The process yielded an aqueous dispersion of the copolymer containing about 50 parts by weight of the resin.

Example II 5 parts of an ethyl ether of hexamethylol melamine were mixed into 100 parts of an aqueous dispersion containing about 50 parts of polymerized vinyl chloride. After a uniform mixture was obtained by mechanical agitation, a film approximately .030" was cast on a smooth glass plate. The film was dried at about 20° C., resulting in a 50% diminution in volume occurring solely in the thickness of the film. The dried film measured close to .015" in thickness and the broad dimensions were substantially the same as those of the undried film.

Example III 2 parts of a methyl Cellosolve ether of hexamethylol melamine were mixed into 100 parts of an aqueous dispersion containing approximately 50 parts of a vinyl chloride-vinyl acetate (85% vinyl chloride–15% vinyl acetate) copolymer. A .010" film cast from the dispersion shrank on drying to .005" without substantial shrinkage in the broad dimensions of the original film.

The unusual properties shown by the dispersions of the examples, i. e., shrinkage in one dimension only, make it possible to accurately control the dimensions of the films. Thus, a film may be cast to the exact length and breadth dimensions with the surety that on drying, the broad dimensions will be unaltered and no cutting or trimming will be necessary. The temperature used to dry the dispersions may be varied between room temperature (about 20° C.) and about 120° C. The only effect of the temperature used is to determine the drying rate which increases with an increase in temperature.

The vinyl halide polymer and copolymer dispersions of this invention are prepared by the polymerization of a vinyl halide including vinyl fluoride, vinyl chloride, vinyl bromide and vinyl iodide alone or with another polymerizable compound in aqueous emulsion.

A small amount of a dispersing or emulsifying agent is used to facilitate the formation of the dispersion and to help control the particle size of the polymers and copolymers. Various dispersing or emulsifying agents may be used, such as alkali metal sulfates or sulfonates of organic compounds. Examples of the dispersing agents are: the sodium salts of dialkyl sulfosuccinic acid esters such as the sodium sulfonate of dioctyl succinate, sodium salts of aliphatic or aromatic hydrocarbons of high molecular weight, such as sodium alkyl naphthalene sulfonate, sodium lauryl sulfate, sodium diisobutyl naphthalene sulfonate, dodecyl benzene sodium sulfonate, decyl benzene sodium sulfonate, sodium disulfonate of dibutyl phenyl phenol, sodium salts of higher synthetic secondary alcohols, sodium salts of mahogany acids, etc. In place of the sodium salts, other alkali metal salts may be used, such as potassium, cesium, lithium and rubidium salts.

Polymerized vinyl halides or vinyl halides polymerized with one or several other polymerizable compounds are used as the base resin of this invention. As examples of copolymerizable materials which may be used are vinyl esters of carboxylic acids such as vinyl acetate, vinyl propionate, vinyl butyrate, vinyl stearate, vinyl benzoate; vinyl aromatic compounds, such as styrene, ortho, meta or para chlorostyrenes, 2,4-dichlorostyrene, 2,5-dichlorostyrene, paramethyl styrene, paraethyl styrene, vinyl naphthalene, divinyl benzene, alpha methyl styrene; esters of acrylic and alpha-substituted acrylic acids such as alkyl acrylates including methyl acrylate, ethyl acrylate, propyl acrylate, isopropyl acrylate, butyl acrylate, 2-ethyl hexyl acrylate, decyl acrylate, allyl acrylate, methallyl acrylate and the corresponding esters of methacrylic, ethacrylic, phenylacrylic, etc. acids; dienes such as butadiene, chloroprene, isoprene, 2,4-dimethyl butadiene-1,3, cyanoprene, piperylene, etc.; amides such as acrylic amide, methacrylic amide; nitriles such as acrylonitrile, methacrylonitrile, ethacrylonitrile; vinylidene halides and other vinylidene derivatives such as vinylidene chloride, vinylidene fluoride, vinylidene fluorochloride, etc. The term "vinylidene" is considered to be generic to each of the compounds listed above and to the general classes of which they are a part.

Other polymerizable unsaturated compounds which may be copolymerized with the vinyl halides are the $\alpha,\beta$-unsaturated dicarboxylic acids and their derivatives such as fumaric, maleic, itaconic, mesaconic, citraconic, crotonic, aconitic, etc., acids and their esters, amides and nitriles. Examples of such derivatives are the methyl, ethyl, propyl, butyl, isobutyl, amyl, hexyl, heptyl, 2-ethyl hexyl, octyl, allyl, methallyl and phenyl esters, fumaronitrile, fumaramide, maleic diamide, maleic acid nitrile, etc.

The copolymers may be derived from two or more polymerizable monomers of which, in general, the vinyl halide should constitute at least 50% by weight.

The ethers of methylol melamines which are applicable to this invention are the water-soluble reaction products of an alcohol and a soluble melamine-formaldehyde condensation product. The methylol melamines may be prepared by reacting 1 mol of melamine with from 1 to 6 or more mols of formaldehyde under alkaline conditions. The resulting methylol melamines may be crystallized and spray dried from an aqueous slurry to provide substantially monomeric crystalline compounds or they may be partially polymerized and dried to provide an amorphous material. The resultant methylol melamines are then reacted in the presence of acid with an alcohol to provide the ethers of this invention. Only those ethers which are water-soluble are applicable to this invention, among which are: methyl, ethyl, ethylene glycol monomethyl ether, ethylene glycol monoethyl ether and amino butanol ethers of methylol melamines.

The amount of water-soluble methylol melamine ethers may be varied from about 1 to about 15 parts per 100 parts of vinyl halide polymer or copolymer. They have a definite softening and toughening action on the vinyl polymer constituent of the latex and the amount used will depend on the properties desired in the finished film.

Various conventional additives such as fillers, pigments, dyes, lubricants, stabilizers, etc. may be added to the dispersions to obtain desired properties in the finished films.

The films produced from the dispersions of this invention are tough, clear if desired, and uniform. The thickness of the films may be controlled by controlling the thickness of the film as cast since shrinkage on removal of the water changes only the thickness of films cast therefrom. Since the shrinkage is confined to the thickness, films may be cast from the dispersions to the exact broad dimensions required and little or no wastage occurs.

It is obvious that many variations may be made in the products and processes of this invention without departing from the spirit and scope thereof as defined in the appended claims.

What is claimed is:

1. A process of making a self-supporting film which comprises dissolving 1–15 parts of a water-soluble ether of a methylol melamine in an aqueous dispersion containing 100 parts of a water-insoluble thermoplastic vinyl halide polymer in which the vinyl halide constitutes a major proportion by weight of the polymer dispersed in water, casting the modified dispersion thus prepared and drying the cast film at 20° to 120° C.

2. A process as in claim 1 wherein the vinyl halide polymer is a copolymer of which the vinyl halide constitutes at least 50% by weight.

3. A process as in claim 2 wherein the vinyl halide is a vinyl chloride.

4. A process as in claim 3 wherein the second component of the copolymer is diethyl maleate.

5. A process as in claim 1 wherein the vinyl halide polymer is a polymer of vinyl chloride.

6. A process as in claim 1 wherein the water-soluble ether of methylol melamine is the methyl ether of hexamethylol melamine.

7. A process as in claim 6 wherein the vinyl halide polymer is a polymer of vinyl chloride.

HAROLD F. PARK.
MILTON J. SCOTT.

REFERENCES CITED

The following references are of record in the file of this patent:

UNITED STATES PATENTS

| Number | Name | Date |
|---|---|---|
| 2,291,080 | Hofferbert | July 28, 1942 |
| 2,364,172 | Stauffer | Dec. 5, 1944 |
| 2,402,032 | Fischer | June 11, 1946 |
| 2,416,447 | Laughlin et al. | Feb. 25, 1947 |
| 2,450,902 | Marberg | Oct. 12, 1948 |

FOREIGN PATENTS

| Number | Country | Date |
|---|---|---|
| 221,004 | Switzerland | Aug. 1, 1942 |
| 225,490 | Switzerland | May 17, 1943 |

OTHER REFERENCES

Paint Oil & Chemical Review, pages 50–52, November 14, 1946.